(12) United States Patent
Tinn

(10) Patent No.: US 6,779,941 B2
(45) Date of Patent: Aug. 24, 2004

(54) CONNECTOR DEVICE

(75) Inventor: David Stanley Ohn Tinn, Cookham Dean (GB)

(73) Assignee: Kee Klamp Limited, Berkshire (GB)

( * ) Notice: Subject to any disclaimer, the term of this patent is extended or adjusted under 35 U.S.C. 154(b) by 0 days.

(21) Appl. No.: 10/014,582

(22) Filed: Dec. 14, 2001

(65) Prior Publication Data

US 2002/0076270 A1 Jun. 20, 2002

(30) Foreign Application Priority Data

Dec. 14, 2000 (GB) .............................................. 0030490

(51) Int. Cl.[7] .............................................. F16L 41/00
(52) U.S. Cl. ...................................................... 403/192
(58) Field of Search ................................ 403/396, 192, 403/187, 188; 256/59, 65.16; 285/276, 404

(56) References Cited

U.S. PATENT DOCUMENTS

| | | | | |
|---|---|---|---|---|
| 2,090,863 A | * | 8/1937 | Feykert | 403/174 |
| 3,900,221 A | * | 8/1975 | Fouts | 285/276 |
| 4,676,687 A | * | 6/1987 | Koffler | 403/188 X |
| 5,149,143 A | * | 9/1992 | Howell | 285/404 X |
| 6,039,308 A | * | 3/2000 | Venegas, Jr. | 256/73 |
| 6,227,752 B1 | * | 5/2001 | Friedrich | 403/192 |
| 6,447,028 B1 | * | 9/2002 | LaMarca et al. | 285/404 |
| 2002/0134976 A1 | * | 9/2002 | Swartz | 256/59 |

FOREIGN PATENT DOCUMENTS

EP 0 703 128 3/1996

* cited by examiner

Primary Examiner—John R. Cottingham
(74) Attorney, Agent, or Firm—Young & Thompson

(57) ABSTRACT

A connector device for forming a structural inter-connection between two members, such as an inclined hand rail and a vertical support post, and which permits variation of the angle of inter-connection includes a body portion having a bore defining a housing to receive one of two members to be inter-connected and a stem portion of substantially cylindrical form having a major axis disposed substantially perpendicular to the major axis of the bore defined by the body portion, the stem portion being adapted to be received, in use, in a housing defined by a bore of a second of the two members to be inter-connected by the connector device, and the stem portion comprising in the outer surface thereof an annular groove having the major axis thereof coincident with the major axis of the stem portion and the annular groove being provided axially inwards from the distal end of the stem portion.

18 Claims, 2 Drawing Sheets

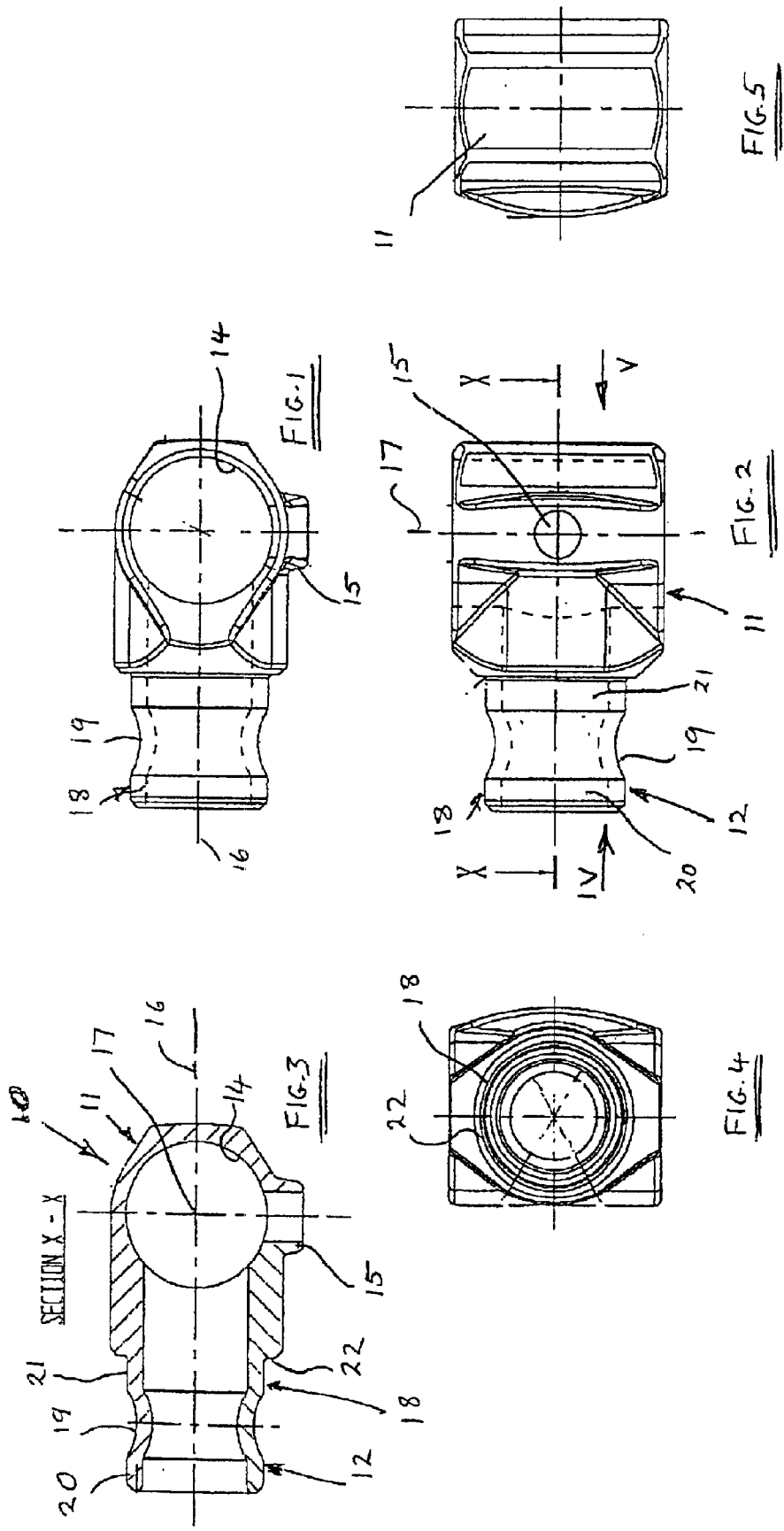

CONNECTOR DEVICE

BACKGROUND OF THE INVENTION

1. Field of the Invention

This invention relates to a connector device for forming a structural inter-connection between two members and which permits variation of the angle of inter-connection.

The invention relates also to an assembly, and method of forming an assembly, of two members inter-connected by at least one said connector device.

One example of an application for which the present invention seeks to provide an improved connector device is that of a structure of metal tubes employed to form a handrail for stairs, steps or a ramp.

2. Description of the Prior Art

Many types of tube connectors have been proposed and used successfully for such structures. An example of one type of tube connector which is relatively low in cost is one made from malleable cast iron and having boss formations each for location of a grub screw whereby one or more tubular members may be slid into the or each housing formed by the cast tube connector and locked into position by tightening of the grub screws.

In an installation, such as for a stairway or ramp, which is required to support a hand rail in a position inclined relative to the horizontal and other members of the rail assembly, it is known to provide a connector device of a type having a through-bore to receive one of a vertical support post and inclined handrail, and a stem portion for location within a housing provided by a conventional type three-way connector fitted to the other of the vertical support post and inclined handrail.

Although use of said connector device and three-way connector is found to provide a strong, reliable and long lasting inter-connection of a vertical support post and inclined hand rail, the assembly procedure is difficult for an operator to perform single-handed. That difficulty arises because of the tendency for the stem portion of one or more of a required series of connector devices to slip axially outwards from the housing of the three-way connector as other connector devices in the series are assembled, and prior to tightening of locking screws which in the finished assembly firmly lock together each associated pair of connector device and three-way connector.

SUMMARY OF THE INVENTION

The present invention seeks to provide an improved connector device, safety rail installation, and method of assembly of a safety rail installation whereby the aforedescribed difficulty is mitigated or overcome.

In accordance with one aspect of the present invention a connector device comprises a body portion having a bore defining a housing to receive one of two members to be inter-connected and a stem portion of substantially cylindrical form having a major axis disposed substantially perpendicular to the major axis of said bore defined by the body portion, said stem portion being adapted to be received, in use, in a housing defined by a bore of a second of the two members to be inter-connected by the connector device, and said stem portion comprising in the outer surface thereof an annular groove having the major axis thereof coincident with the major axis of the stem portion and said annular groove being provided axially inwards from the distal end of the stem portion.

The stem portion may be of a hollow, tubular form. If the stem portion is hollow it is preferred that the wall thickness of the stem portion at an axial position aligned with the annular groove is substantially equal to that wall thickness of the stem portion at least at a position to one side of the groove.

The annular groove preferably is of substantially uniform width and depth as considered in a circumferential direction of the groove. It is further preferred that the width of the groove is equal to or greater than the diameter of a locking means, such as a grub screw, carried by the second of the two members to be inter-connected. The groove may comprise a rectangular or curved shape in cross-section i.e. in a cross-sectional plane containing the major axis of the stem portion. Particularly in the case of use with a member having a locking means the leading edge of which is of a conical shape, the groove may be of 'V' shape in cross-section; the included apex angle of the 'V' shape preferably corresponds with that of the leading edge of the locking means.

An example of a particularly suitable material for the connector device of the invention is cast aluminium. Other materials such as cast iron or high strength plastics may be used.

The invention envisages that the outer surface of the stem portion of the connector device may have a diameter corresponding to the inner diameter of a cylindrical housing defined by the body portion. However these diameters may be different, particularly if the connector device is to be used to connect a handrail of a different diameter tube to that of a support post. The body portion may define a single through-bore or, for example, two housing sections which may be either axially aligned or inclined relative to one another.

At the surface of the stem portion the annular groove preferably has a width, i.e. dimension in the direction of the major axis of the stem portion, which is at least one quarter and more preferably at least one third of the axial length of the stem portion.

The ratio of the axial length of the stem portion to the diameter of the stem portion preferably lies in the range 2 to 0.5. A ratio in the range 1.5 to 0.75, e.g. a ratio of 1.0, is considered particularly suitable.

The body portion of the connector device may provide an abutment surface for contact, in use, by an end of said housing of said second of two members to be inter-connected by the connector device.

In accordance with another of its aspects the present invention provides a method of forming an assembly of inter-connected members in which one elongate member is secured to other members at a plurality of positions axially spaced along the length of the elongate member, said method comprising providing a plurality of connector devices each of a kind in accordance with the present invention for inter-connecting a first and a second member, providing a plurality of second members each having a housing which defines a bore into which the stem portion of a respective connector device may be received and said housing of the second member comprising locking means adapted to extend into the annular groove of the connector device and to lie either in a retracted position whereby the stem portion may move freely into and out of said housing or one of at least two locking positions, a first locking position being one at which the locking means inhibits axial movement of the stem portion outwards from said housing but allows relative rotational movement of the stem portion and housing and the second locking position being one at which the locking means bears against the stem portion to inhibit both said axial and rotational movements, the method further comprising the steps of providing an elongate member to extend through a passage defined by one of the connector device and second member of each pair of connector device and second member and of moving locking means of a second member to said first position in the groove of a connector device whilst one or more other pairs of connector device and second member are positioned relative to the elongate member.

Preferably at least some and more preferably all of the locking means of the second members are moved to the second locking position when the inter-connected members of the assembly are in the required positions relative to one another.

The elongate member of the method aspect of the invention may be a first member which extends through a through-bore defined by one or more connector devices of a series. The second members may be secured for example to a wall surface or other structure or may comprise a housing, for example a through housing, which receives a support member such as a vertical post.

The elongate member of the method aspect of the invention may be a third member which extends through a through-bore defined by one or more second members of the series. The connector devices may be secured for example to respective vertical posts which may be located in housings defined by the body portions of the connector devices.

In a series of connector devices and associated second members an elongate member may extend through the combination of at least one through housing defined by the body portion of a connector device, and at least one through housing defined by a second member.

When the method of the invention is applied to forming an assembly comprising an inclined hand rail the method may comprise use of connector devices each of a kind having a bore defined by the body portion and providing a respective vertical post to extend into each said bore, and the second of the two members to be inter-connected by the connection device may be a three-way type connector having a through-bore, with the inclined hand rail member extending through the through-bores of a plurality of said second members, the locking means of one second member being arranged in said first position to locate axially with one connector device whilst a similar inter-connection is formed between a second and subsequent associated pairs of connector devices and second members, and thereafter moving each said locking means to said second position thereby to firmly inter-connect the respective pairs of connector devices and second members.

Whilst it is envisaged that the method typically may comprise securing the connector device of the invention to a vertical post, for example by means of a grub screw in the wall of the body portion of the connector device, the connector device of the present invention may be arranged with a hand rail member extending therethrough, and vertical posts for support of the hand rail may each be connected to said connector device by means of a second member such as a three-way connector secured to the vertical post.

The present invention envisages that in the case of use of a three-way connector having a housing to receive the stem portion of a connector device, and comprising a through-bore for receiving an elongate member, preferably the major axis of said housing is substantially perpendicular to the major axis of said through-bore.

In accordance with a further of its aspects the present invention provides an assembly of elongate members inter-connected by a connector device in accordance with the present invention, and an assembly formed by the method of the invention.

BRIEF DESCRIPTION OF THE DRAWINGS

One embodiment of the present invention will now be described, by way of example only, with reference to the accompanying diagrammatic drawings in which:

FIG. 1 is a plan view of a connector device in accordance with the present invention;

FIG. 2 is a side view of the connector device of FIG. 1;

FIG. 3 is a section on the line "X—X" of FIG. 2;

FIG. 4 is an end view in the direction of the arrow 1V of FIG. 2;

FIG. 5 is an end view in the direction of the arrow V of FIG. 2, and

DESCRIPTION OF THE PREFERRED EMBODIMENT

Figure 6:
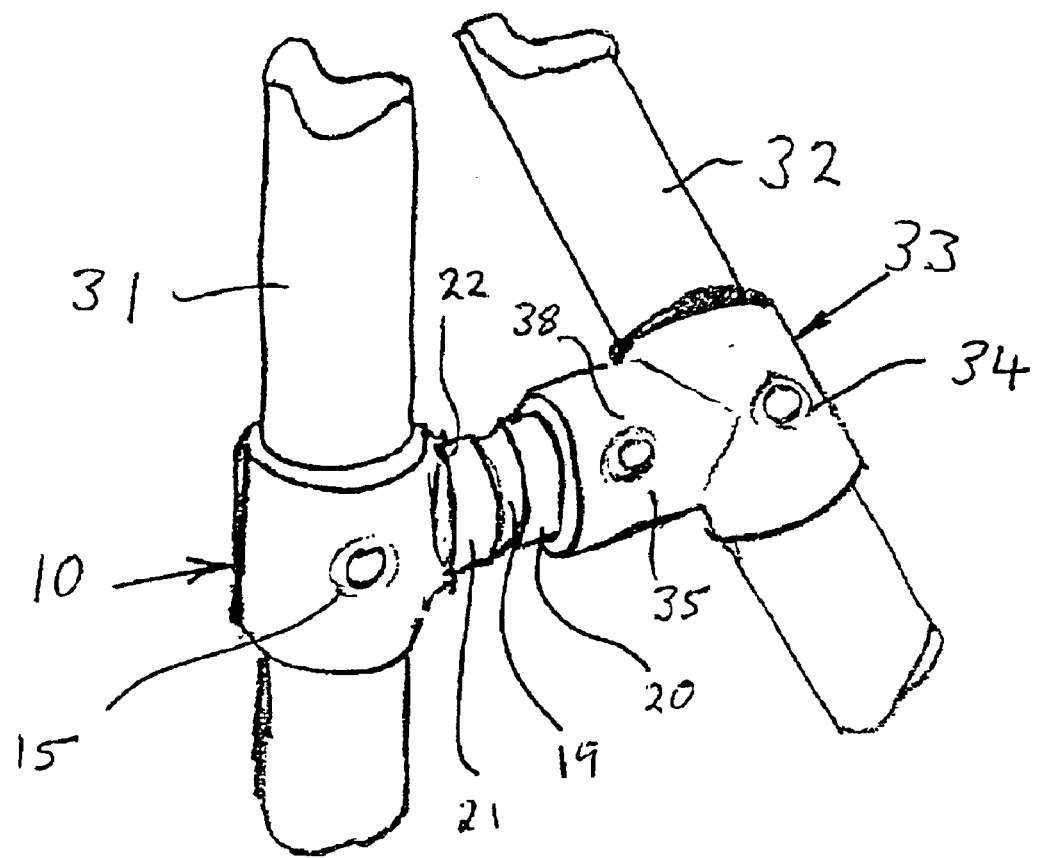
FIG. 6 is a perspective view of part of a part formed hand rail assembly of the present invention.

With reference to FIGS. 1 to 5, a connector device 10 comprises a body portion 11 and a stem portion 12 integrally formed from cast aluminium.

The body portion 11 comprises a through-bore 14 dimensioned to receive a standard size vertical post of a hand rail assembly. The wall of the through-bore 14 is provided with a screw threaded aperture 15 to receive a grub screw (not shown) in known manner for the purpose of enabling a vertical post to be secured axially within the through-bore 14 upon tightening of the grub screw.

The stem portion 12 is of a tubular form and has a major axis 16 which extends perpendicular to the major axis 17 of the body portion. The axis 16 of the stem portion is the major axis of a substantially cylindrical outer surface 18 defined by the stem portion. The stem portion is, in this embodiment, of a hollow form, and the cavity defined by the stem portion extends into communication with the through-bore 14 of the body portion. The substantially cylindrical outer surface 18 of the stem portion comprises a recess in the form of a circumferentially extending groove 19 the major axis of which is coincident with the major axis 16 of the stem portion. The groove 19 is of a curved shape in cross-section (see FIG. 3) and the radial thickness of the wall of the stem portion where it defines the annular groove 19 is equal to the wall thickness at the distal end 20 and at an inner end 21 lying between the groove 19 and the body portion 11.

The body portion 11 provides an annular abutment face 22 adjacent the inner end section 21 of the stem portion. The length of the stem portion between the abutment 22 and distal end 20 is substantially equal to the diameter of the cylindrical surface 18 of the stem portion. That axial length of the stem portion is also double the axial length of the circumferentially extending annular recess 19.

In this embodiment the depth of the recess is approximately fifty percent of the wall thickness of the stem portion, that being sufficient to ensure that when the housing of a second member is fitted over the stem portion and a grub screw or like locking means carried by the second member is moved radially inwards, that locking means can restrain axial movement of the stem portion outwards from the housing of the second member whilst nevertheless permitting the stem portion to rotate relative to the second member.

Part of a hand rail assembly in a part formed condition is shown in FIG. 6. This assembly comprises the connector device 10 of FIGS. 1 to 5 secured to a vertical post member 31 by means of a grub screw carried in the screw aperture 15. The hand rail 32 for mounting in inclined position relative to the vertical post has secured thereto a three-way type connector 33. The connector 33 comprises a through-bore through which the rail 32 extends and which is locked in position by means of a grub screw in a screw thread 34. The three-way connector additionally comprises a housing portion 35 which extends perpendicularly relative to the through-bore and is dimensioned to be a sliding fit over the stem portion of the connector 10.

FIG. 6 shows the housing of the three-way connector at the point at which it is in alignment with and about to be slid over the stem portion of the connector device 10. When fully slid into position, with the end of the housing portion 35 of the three-way connector contacting the flange 22, the screw thread 38 in the wall of the housing aligns axially with the recess 19 in the stem portion of the connector device. Accordingly tightening of a grub screw in the screw threaded aperture 38 brings the inner end of the grub screw into a mechanical interlock position in the groove.

To assist in assembly of the other components required to form a plurality of connections between a hand rail and vertical support posts the grub screw in the aperture 38 optionally may be lightly tightened so that in addition to providing axial interlock it tends to resist relative rotational movement. Subsequent to assembly of the components in their required relative positions the grub screws 38 of the respective three-way connectors of a series may all be more firmly tightened, as well as those locking the hand rail to the through-bore of each three-way connector.

The grub screw in each screw thread 38 or resisting relative rotation of the three-way connector and connector device is required only to prevent relative rotational movement during the assembly operation, and that resistance to rotation is not required in the final assembly when other connectors are in position. Accordingly those grub screws do not need to be tightened with such great force and in consequence the wall strength of the stem portion of the connector device does not need to be as great as would otherwise would be necessary. A saving in weight and material cost for the stem portion is thereby achieved in addition to effectively resisting axial separation of associated pairs of connector devices and three-way connectors during the assembly operation.

What is claimed is:

1. A connector device assembly for forming a structural interconnection between two members, said assembly comprising:
   a connector device,
   one of two members to be inter-connected, and
   locking means selectively operable to inter-connect the connector device and said one of two members,
   said connector device comprising a body portion having a bore defining a housing to receive a first of said two members to be inter-connected and a stem portion of substantially cylindrical form having a major axis disposed substantially perpendicular to the major axis of said bore defined by the body portion,
   said stem portion being adapted to receive, in use, in a second housing defined by a bore of a second of said two members to be inter-connected by the connector device,
   said stem portion comprising in the outer surface thereof an annular groove having the major axis thereof coincident with the major axis of the stem portion,
   said annular groove being provided axially inwards from the distal end of the stem portion, and
   said locking means being supported by said housing of the second of said two members to lie either in i) a retracted position whereby the stem portion may move freely into and out of said housing of the second member or ii) one of at least two locking positions in which the locking means extends into said annular groove, a first of said two locking positions being one at which the locking means inhibits axial movement of the stem portion outwards from said housing of the second member but allows relative rotational movement of the stem portion and housing, and a second locking position being one at which the locking means bears against the stem portion to inhibit both said axial and rotational movements.

2. A connector device assembly according to claim 1, wherein the stem portion is of a hollow tubular form.

3. A connector device assembly according to claim 2, wherein the wall thickness of the stem portion at an axial position aligned with the annular groove is substantially equal to that wall thickness of the stem portion at least at a position to one side of the groove.

4. A connector device assembly according to claim 1, wherein the annular groove is of substantially uniform depth as considered in a circumferential direction of the groove.

5. A connector device assembly according to claim 1, wherein the annular groove is of substantially uniform width as considered in a circumferential direction of the groove.

6. A connector device assembly according to claim 1, wherein the groove is of a curved shape in cross-section.

7. A connector device assembly according to claim 1, wherein the ratio of the axial length of the stem portion to the diameter of the stem portion lies in the range 2 to 0.5.

8. A connector device assembly according to claim 7, wherein said ratio is in the range 1.5 to 0.75.

9. A connector device assembly according to claim 8, wherein said ratio is substantially equal to 1.0.

10. A connector device assembly according to claim 1, wherein the body portion provides an abutment surface at one end of the stem portion for contact, in use, by an end of a housing of said second of the two members to be inter-connected by the connector device.

11. A connector device assembly according to claim 1, wherein the body portion defines a through-bore to receive one of two members to be inter-connected.

12. A connector device assembly according to claim 1, wherein the annular groove at the surface of the stem portion has a width which is at least one quarter of the axial length of the stem portion.

13. A connector device assembly according to claim 12, wherein the width of the annular groove is at least one third of the axial length of the stem portion.

14. A connector device assembly according to claim 1, wherein the stem portion and body portion are integrally formed from cast or molded material.

15. A connector device assembly according to claim 1, wherein,
   the stem portion further comprises an annular abutment face,
   the housing defined by the bore of the second member, in use, abutting the abutment face and entirely extending over the annular groove,
   the annular groove being apart from and intermediate the abutment face and the distal end.

16. A connector device, comprising:
   a body portion; and a stem portion, wherein,
- the body portion comprises a through-bore dimensioned to receive a post, the through-bore being open at two ends to pass the post through each of the two ends,
- a wall of the through-bore is provided with a screw threaded aperture to receive a screw for enabling the post to be secured axially within the through-bore upon tightening of the screw,
- the stem portion is of a tubular form and has a major axis which extends perpendicular to a major axis of the body portion,
- the axis of the stem portion is a major axis of a substantially cylindrical outer surface defined by the stem portion,
- the substantially cylindrical outer surface of the stem portion comprises a recess in the form of a circumferentially extending groove, the major axis of the groove is coincident with the major axis of the stem portion,
- the groove is curve shape in cross-section creating a curved annular depression in the substantially cylindrical outer surface defined by the stem portion,
- the body portion provides an annular abutment face adjacent an inner end section of the stem portion, and
- the groove is located apart from the annular abutment face, wherein, the stem portion is of a hollow form with a cavity defined by the stem portion extending into communication with the through-bore of the body portion.

17. The connector device of claim 16, wherein the body portion and the stem portion are integrally formed as a single cast piece.

18. A connector device, comprising:
a body portion; and
a stem portion, wherein,
- the body portion comprises a through-bore dimensioned to receive a post, the through-bore being open at two ends to pass the post through each of the two ends,
- a wall of the through-bore is provided with a screw threaded aperture to receive a screw for enabling the post to be secured axially within the through-bore upon tightening of the screw,
- the stem portion is of a tubular form and has a major axis which extends perpendicular to a major axis of the body portion,
- the axis of the stem portion is a major axis of a substantially cylindrical outer surface defined by the stem portion,
- the substantially cylindrical outer surface of the stem portion comprises a recess in the form of a circumferentially extending groove, the major axis of the groove is coincident with the major axis of the stem portion,
- the groove is curve shape in cross-section creating a curved annular depression in the substantially cylindrical outer surface defined by the stem portion,
- the body portion provides an annular abutment face adjacent an inner end section of the stem portion, and
- the groove is located apart from the annular abutment face, wherein, a radial thickness of a wall of the stem portion at the annular groove is equal to a wall thickness at a distal end of the stem portion and at an inner end of the stem portion lying between the groove and the body portion.

* * * * *